US007339689B2

(12) United States Patent
Hiraoka

(10) Patent No.: US 7,339,689 B2
(45) Date of Patent: Mar. 4, 2008

(54) RECORDING APPARATUS WITH PRINT FUNCTION AND COPY FUNCTION, INCLUDING STORING CHARGES FOR EACH FUNCTION

(75) Inventor: Toru Hiraoka, Nagaokakyo (JP)

(73) Assignee: Murata Kikai Kabushiki Kaisha, Kyoto-shi (JP)

(*) Notice: Subject to any disclaimer, the term of this patent is extended or adjusted under 35 U.S.C. 154(b) by 1017 days.

(21) Appl. No.: 10/151,937

(22) Filed: May 22, 2002

(65) Prior Publication Data

US 2003/0016384 A1    Jan. 23, 2003

(30) Foreign Application Priority Data

May 23, 2001  (JP)  ............................ 2001-153634

(51) Int. Cl.
*G06F 15/00*      (2006.01)
*G03G 21/02*      (2006.01)
(52) U.S. Cl. ........................ 358/1.15; 399/79; 358/1.15
(58) Field of Classification Search ................ 399/79, 399/53, 252–254; 358/1.15; 709/206, 213; 710/15, 67; 158/498, 440; 235/380, 382
See application file for complete search history.

(56) References Cited

U.S. PATENT DOCUMENTS 5,797,067 A * 8/1998 Mitekura ................... 399/79
6,052,547 A * 4/2000 Cuzzo et al. ............... 399/79
2001/0017700 A1 * 8/2001 Homma ..................... 358/1.1
2002/0051164 A1 * 5/2002 Watanabe et al. .......... 358/1.13

FOREIGN PATENT DOCUMENTS

| DE | 198 27 715 | 12/1999 |
|----|------------|---------|
| JP | 9-160452   | 6/1997  |
| JP | 9-300784   | 11/1997 |
| JP | 11-098291  | 4/1999  |

* cited by examiner

*Primary Examiner*—Saeid Ebrahimi
(74) *Attorney, Agent, or Firm*—Westerman, Hattori, Daniels & Adrian, LLP.

(57) ABSTRACT

A recording apparatus, with a print function, a facsimile receiving function, and a print function for recording the image or the document onto the recording sheet, which is capable of being connected to an image forming device, and of setting independently and calculating appropriately the charge for each type of recording functions, so as to store the charge per unit quantity of recording sheet for each type of functions, as well as to calculate the accumulated charge for each type of functions based on the number of the used recording sheets and the charge per unit quantity for each type of functions.

11 Claims, 4 Drawing Sheets

RECORDING APPARATUS WITH PRINT FUNCTION AND COPY FUNCTION, INCLUDING STORING CHARGES FOR EACH FUNCTION

CROSS REFERENCE TO RELATED APPLICATION

The present application claims priority of Japanese Patent Application No. 2001-153634 filed May 23, 2001 with Japanese Patent Office and the entire disclosure thereof is incorporated herein by reference.

BACKGROUND OF THE INVENTION

1. Field of the Invention

The present invention relates to a recording apparatus having at least a print function and a copy function.

2. Description of the Related Art

The lease charge of recording apparatus such as a copy machine or a facsimile machine on lease in office or other work place is usually calculated according to an amount of used recording sheets. As a newly designed multifunctional recording apparatus such as a recording apparatus with a copy, a facsimile for printing a received image, and a printer for printing image data from a personal computer, emerges in office or other work place, the lease charge might be calculated on the actual upkeep cost for various type of functions.

In the case of the existing multifunctional recording apparatus on lease, an unit charge for a recording sheet is flat rated for any type of functions, and it is usually set according to the cost for copying, that is actually one of the most expensive. Therefore, users who would like to use a plurality of printers on lease at less expensive charges have an impression that flat lease charges are higher than expected, and they keep at a distance from using the printers of the multifunctional recording apparatus on lease.

As a matter of fact, an amount of used recording material such as toner varies in proportion to the rate of printed area, or the rate of the printed area to the recording sheet area. Accordingly, although this rate varies in proportion to the area of words or image printed on the recording sheet, the unit charge for a recording sheet is flat rated for any type of functions, which might be regarded as an inequity for the users.

SUMMARY OF THE INVENTION

To solve the problems mentioned above, the objective of the present invention is to provide a recording apparatus, which is capable of setting independently and calculating appropriately the charge for each type of functions, so as to print out a list of lease charges (for the payment of upkeep costs) based on the charges for each type of functions, such as a copy, a facsimile, a printer, and the like.

Therefore, according to the first aspect of the invention, a recording apparatus is capable of being connected to an image forming device, and comprises a print function for printing the image formed by the image forming device on a recording sheet and a copy function for reading an image on a document and recording the image on a recording sheet. Moreover, the recording apparatus comprises memory means for storing the lease charge per unit quantity for a recording sheet for each type of recording functions, and calculating means for calculating the accumulated lease charges based on the number of used recording sheets and the charge per unit quantity for a recording sheet for each type of functions. Therefore, by setting the appropriate charge per unit quantity for the copy and the printer, the apparatus would calculate the appropriate amount of accumulated charges (for the payment of upkeep costs), and the user would be satisfied with the charges for any kind of functions according the actual market prices.

According to the second aspect of the invention, the recording apparatus as defined in the first aspect of the invention includes a network connection unit for connecting with a communication network, and includes a facsimile receiving function for reproducing the image received via the communication network on the recording sheet. Moreover, the recording apparatus stores the lease charge per unit quantity for a recording sheet for the facsimile receiving, and calculate the accumulated charge for the facsimile receiving function. Therefore, by setting the appropriate charge per unit quantity for the facsimile function, the apparatus can calculate the appropriate amount of accumulated charge (for the payment of upkeep costs).

According to the third aspect of the invention, there is provided the recording apparatus as defined in the first or the second aspect of the invention wherein the calculating means reduces the accumulated charge in proportion to an average threshold value, when the average value of the printed area to the recording sheet area is equal to or less than the threshold set in advance. Further, such a threshold can be set independently for each type of functions, if the average value of the printed area to the recording sheet area is equal to or less than the threshold set in advance. As the average value of printed area is smaller, the quantity of the used recoding material such as toner is smaller. So the accumulated charge is reduced in proportion to the amount of used recording material.

According to the fourth aspect of the invention, there is provided the recoding apparatus as defined in any one of the first to the third aspects wherein the lease charge is recorded on the recording sheet after calculating the accumulated charges for each type of functions. Then, the user confirms with ease the accumulated charges for each type of functions.

DETAILED DESCRIPTION OF THE INVENTION

Figure 1:
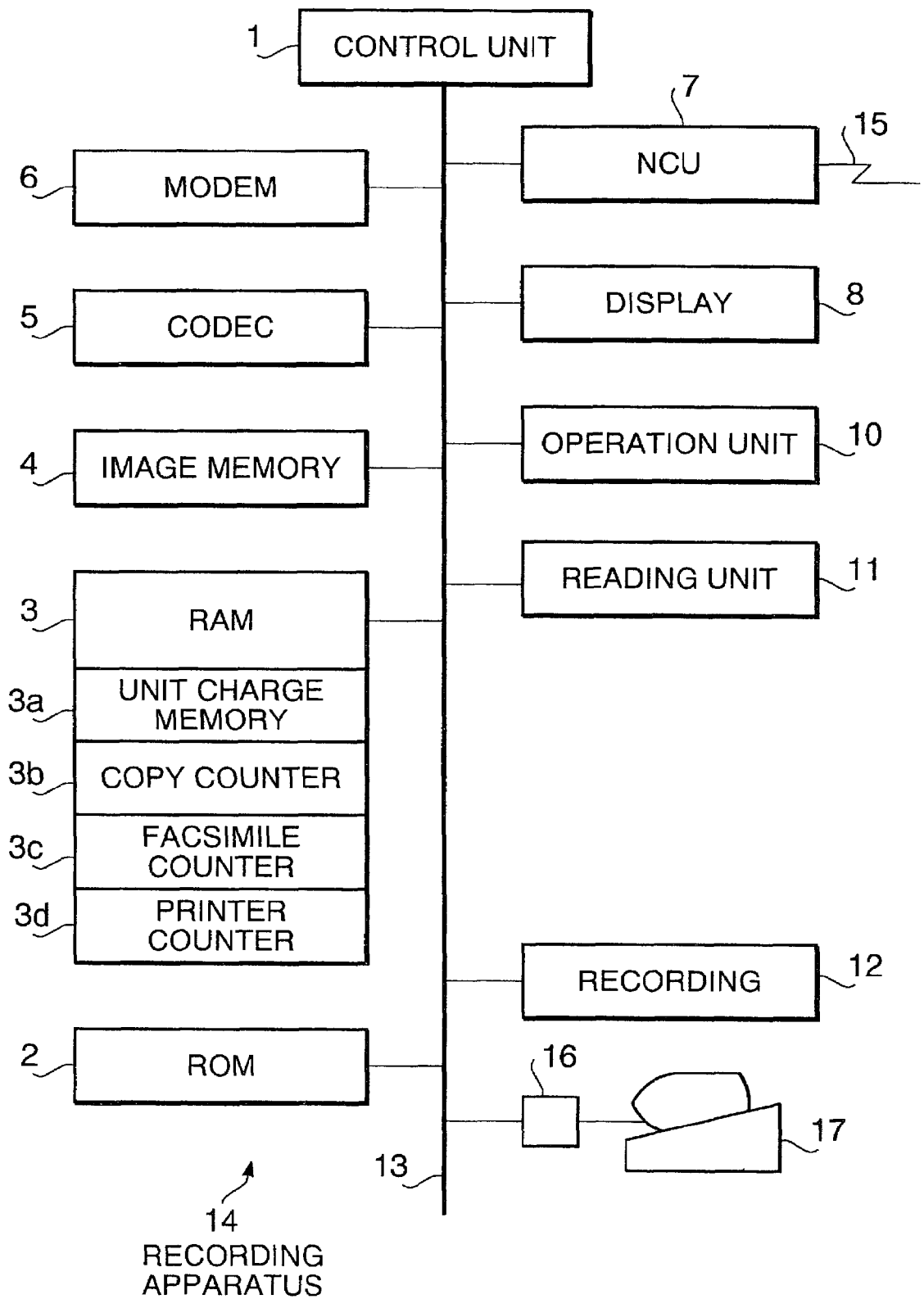
FIG. 1 is a block diagram showing the inner structure of the recording apparatus according to the embodiment of the present invention.

The embodiment of the present invention will be described in reference to the accompanying drawings. As shown in FIG. 1, a recording apparatus 14 with a print function, a facsimile function, and a copy function includes CPU (central processing unit) or the like, which is composed of a control unit 1 as calculating means, ROM 2 (Read-Only Memory), RAM (Random-Access Memory) 3, an image memory 4, a codec 5, a modem 6, NCU (Network Control Unit) 7 as a network connection unit, a display 8, an operation unit 10, a reading unit 11, and a recording unit 12, which are connected to one another via a bus line 13.

The ROM 2 stores a control program for controlling over the whole procedures of the recording apparatus 14, including a copy procedure, a facsimile transmission and receiving procedure, and the like. Additionally, the control program includes a procedure for calculating accumulated lease charge for each type of functions, such as the copy, the facsimile, the printer, or the like of the recoding device 14, based on the charge (upkeep cost) per unit quantity for a recording sheet and the number of used recording sheets for each type of functions, which will be described in detail as follows.

Moreover, the control program includes a procedure for reducing the accumulated lease charge in proportion to the average value of printed area rate, if this rate, namely the average value of the printed image area to the recording sheet area, is equal to or less than the threshold set in advance, as described in the following flow chart. Actually, the threshold of the printed area rate can be set independently for each type of functions.

On the other hand, the RAM 3 temporarily stores various data necessary for the control unit 1 such as a scale, a density, and number of the copy. Additionally, an unit charge memory 3a (memory means) is provided in a certain range within the RAM 3, so as to store the charge per unit quantity for a recording sheet (the charge per sheet) for each type of functions of the recording apparatus 14, the threshold as the printed area rate for each type of functions, and the average of printed area rate renewed after the recording for each type of functions.

Besides, an example of the charge per unit quantity and the threshold of the printed area rate for each type of functions are shown in the following chart 1. The charge per unit quantity for each type of functions is set independently here partly because it is empirically known that the average printed area rate for each type of functions varies, precisely speaking the quantity of the used recording material for each recording sheet area for each type of functions varies, and partly because the charge for a copy function should include an upkeep cost for the optical system exclusively used for the copy function.

CHART 1

| Function | Charge per Unit Quantity | Threshold of Average Printed Area Rate |
|---|---|---|
| Copy | 6 Yen | 6% |
| Received Facsimile Record | 4 Yen | 4% |
| Printer | 5 Yen | 5% |

As well as, a copy counter 3b, a facsimile counter 3c, and a print counter 3d are provided within the RAM 3. The copy counter 3b stores the number of recorded sheets of the documents, the facsimile counter 3c stores the number of recorded sheets of the documents received by the facsimile, and the print counter 3d stores the number of recorded sheets by the printer. At least the unit charge memory 3a, the copy counter 3b, the facsimile counter 3c, and the print counter 3d within the RAM 3 are backed up by a power source or a charged battery (as not necessarily illustrated in the drawings).

The image memory 4 comprises the RAM or the like which is connected to the backed up power source. The image data is read by a reading unit 11, as mentioned as follows, encoded by the codec 5, and then stored in the image memory 4, whose capacity is for accumulating the encoded image data of about tens to hundreds pages of documents.

Accordingly the codec 5 en-codes the image data which is read by the reading unit 11 to be transmitted and also de-codes the en-coded image data received from the corresponding terminal on the other end of line. The modem 6 modulates and demodulates the data to be transmitted and received. It specifically modulates the digital data into a voice bandwidth signal to be transmitted via the NCU 7 to the communication network 15 of the public switched telephone network or the like, and at the same time, demodulates the received voice bandwidth signal via the NCU 7 from the communication network 15 into a digital signal.

The NCU 7 controls the connection of the communication network 15 with the recording apparatus 14, and has a function for transmitting a dial pulse corresponding to the facsimile number of the called terminal as well as a function for detecting an incoming call.

Figure 2:
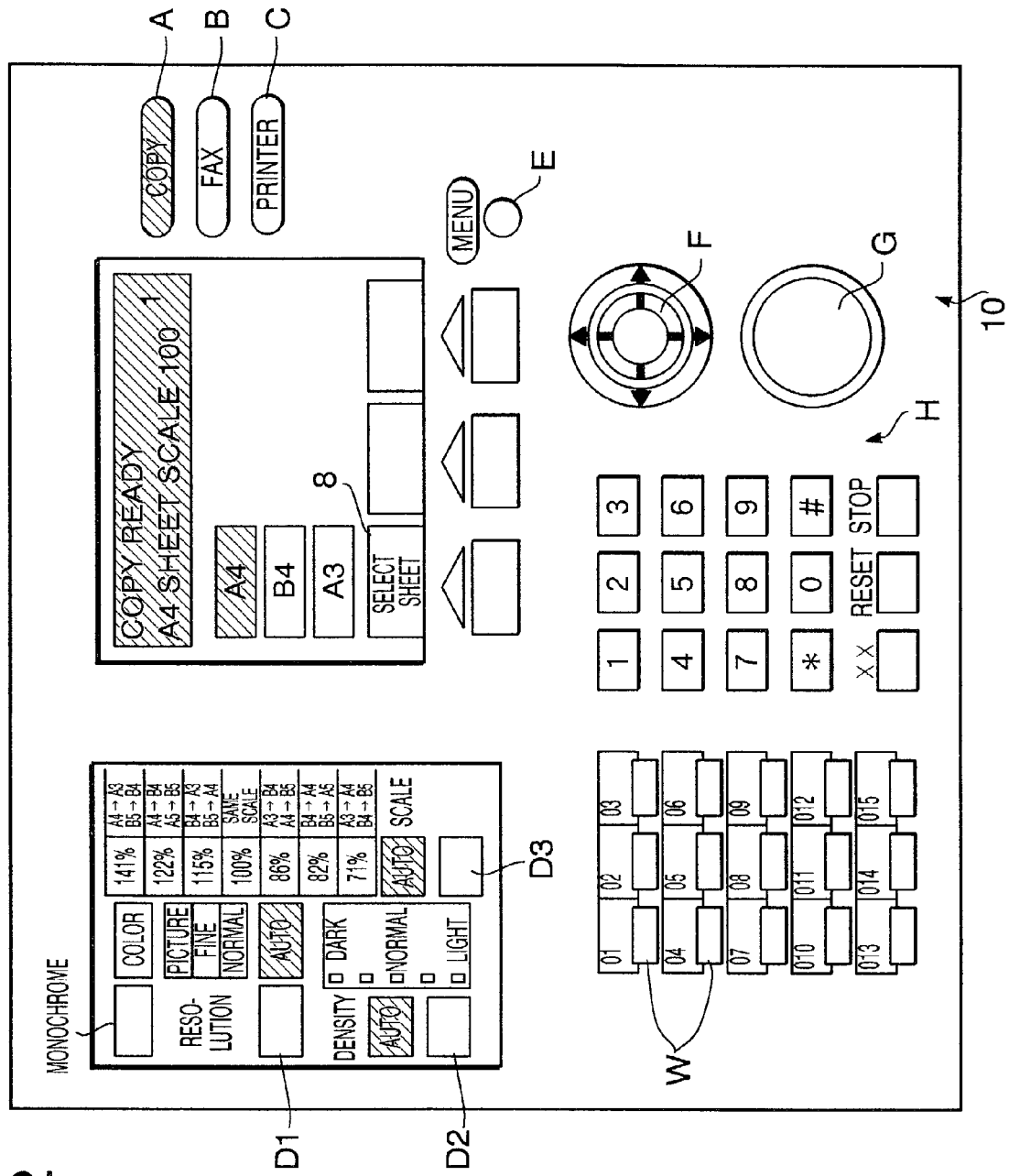
FIG. 2 is a view for explaining the display and the operation unit in the recording apparatus.

As shown in FIG. 2, the display 8 is formed of, for example, a liquid crystal display element, and a plurality of selection keys is provided in the operation unit 10, in which a key A is for selecting the copy, a key B is for selecting the facsimile, and a key C is for selecting the printer. While carrying out each type of functions, a key D1 is for selecting the image quality (resolution), a key D2 is for selecting the density, and a key D3 is for selecting the scale.

A menu key E is for switching the menu on the display 8. Although not necessarily illustrated in the drawings, when the menu key E is pressed repetitively, the menu key E switches the display 8 consecutively from the menu shown in FIG. 2, the menu for registering the facsimile number of the terminal corresponding to a plurality of keys W, the menu for registering the speed-dialing number within about two to three digits corresponding to the facsimile number of the terminal of the other end, to the menu for counting the lease charge for each type of functions, and so forth.

A cross-shaped cursor key F is for moving the cursor (as not necessarily illustrated in the drawings) or various selecting items vertically and horizontally on the display 8, and a start key G is for indicating the start of reading the document (as not necessarily illustrated in the drawings) placed in the reading unit 11. Then, a numeric keypad H is composed of number keys 0 to 9 with a key * and a key #, and a plurality of one-touch keys W is for one-touching each of the keys to be connected with each of the facsimile numbers of the desired terminals on the other end of the line, by registering the facsimile numbers to each of the keys W into the RAM 3 or the like.

As not necessarily illustrated in the drawings, the reading unit 11 includes a reading device composed of an automatic documents feeder supplying a plurality of documents successively to the reading device, a line sensor, and CCD (Charge Coupled Device) and the like, so as to read the document for facsimile transmission. Moreover, as not necessarily illustrated in drawings, the recording unit 12 includes a recording device of an electrophotographic method, an inkjet method or the like, and a plurality of paper cassettes.

In the embodiment as mentioned above, while transmitting the facsimile data, according to the operation of the start key G, the image data of the document read by the reading unit 11 is en-coded by the codec 5, then accumulated in the image memory 4, and modulated by the modem 6, to be transmitted to the terminal of the other end through the communication network 15 from the NCU 7.

Moreover, in the case of receiving the facsimile, the received image data is demodulated by the modem 6, accumulated in the image memory 4, then decoded by the codec 5, and printed on the recording sheet by the recording unit 12. In the case of copying, the image data read by the reading unit 11 is encoded by the codec 5, accumulated in the image memory 4, decoded again by the codec 5, and printed on the recording sheet by the recording unit 12.

Besides, as shown in FIG. 1, the recording apparatus 14 is usable as a printer for a personal computer 17 in connection via the interface device 16 through the bus line 13 to the recording apparatus 14. In this case, the document, the image, or the like formed by the application software of the personal computer 17 is transmitted to the recording apparatus 14 to be printed on the recording sheet by the recording unit 12.

Figure 3:
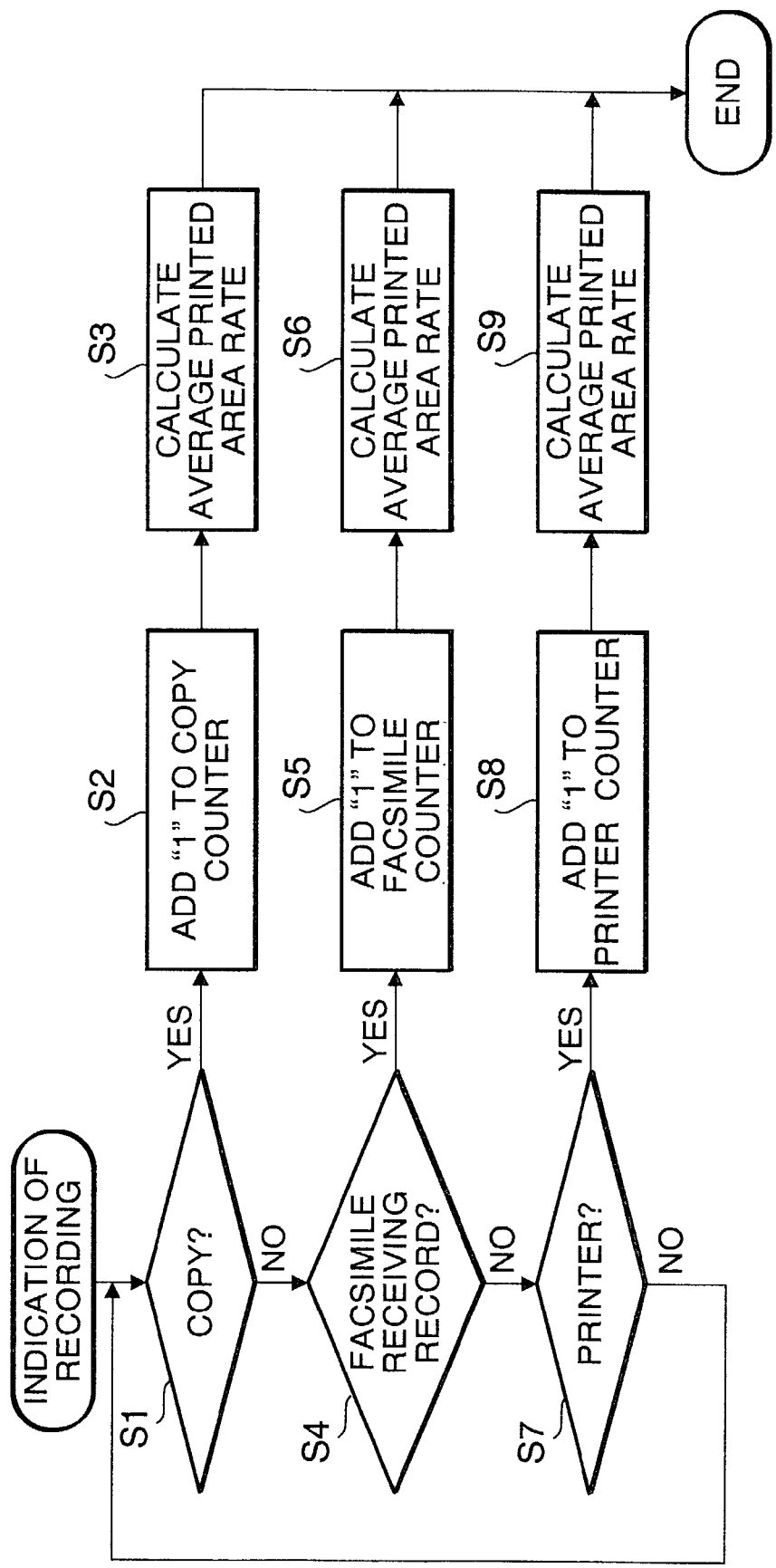
FIG. 3 is a flow chart showing the control procedure when the recording for each type of functions is indicated by the recording apparatus.

According to the flow chart shown in FIG. 3, when the recording apparatus 14 copies the documents, records the received facsimile image, or records the image data transmitted from the personal computer 17, the procedure for calculating and renewing the accumulated lease charges is explained as follows. At first, the copy counter 3*b*, the facsimile counter 3*c* and the printer counter 3*d* are re-set to store an initial value "0" in each counter 3*b* through 3*d* while checking the recording apparatus on a regular service occasion.

Next, in the case of recording by any type of function such as copying, facsimile receiving, or printing, the control unit 1 checks whether or not the recording of copy function is operated (Step 1), and when the copying is executed, the control unit 1 adds "1" to the number of recording sheets for the copy counter 3*b* (Step 2), and calculates the average of printed area rate for the copy function. The renewed average printed area rate is stored in the unit charge memory 3*a* (Step 3). Then, the process stops to end.

Besides, if the image on the recording sheet is recorded through the dot method, the printed area rate is the ratio of the dot number of printed image area to the total dot number of the whole recording sheet area, on which the image is recorded. The average printed area rate is the average value of the entire printed area to the entire recording sheets area after the copy counter 3*b* is reset.

If the recording is not a copying at Step 1, the control unit 1 checks whether or not a facsimile receiving is executed (Step 4). If the facsimile receiving is executed, the control unit 1 adds "1" to the number of the printed sheets of the facsimile counter 3*c* (Step 5), and calculates the average printed area rate for the facsimile receiving. The renewed average printed area rate is stored in the unit charge memory 3*a* (Step 6), and the program stops to end.

When the recording is not a facsimile receiving at Step 4, the control unit 1 checks whether or not a printing is executed (Step 7). When the printing is executed, the control unit 1 adds "1" to the number of the printed sheets of the print counter 3*d* (Step 8), and calculates the average printed area rate for the print function. The average printed area rate is stored in the unit charge memory 3*a* (Step 9), and the program stops to end.

Figure 4:
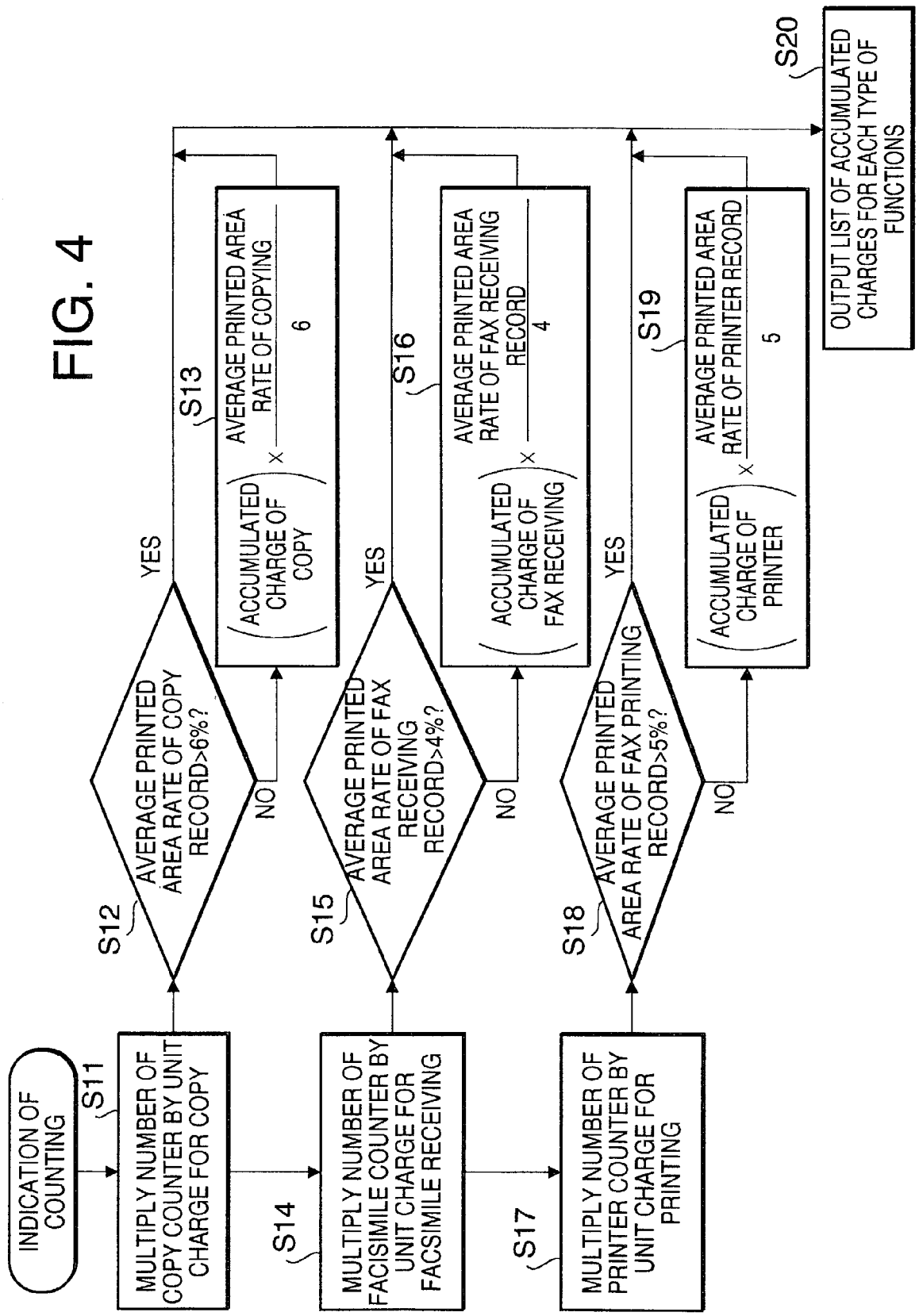
FIG. 4 is a flow chart showing the control procedure when the calculation of lease charge is indicated by the recording apparatus.

Next, according to the flow chart shown in FIG. 4, when the lease charge is counted, in terms of carrying out the designated key operation (for example, operating the menu key E) on the operation unit 10, the control unit 1 starts the counting of the lease charge for each type of functions.

First, the accumulated number of the printed recording sheets, stored in the copy counter 3*b*, is multiplied by the unit charge (6 yen) for a recording sheet for the copy, to calculate the total of lease charge for the copy (Step 11). Then, it is checked whether or not the average printed area rate of copying is more than the threshold of 6% (Step 12). When the average printed area rate of copying is more than the threshold of 6%, the lease charge calculated at Step 11 is directly output as a list of the accumulated charge for the copy (Step 20).

On the other hand, when the average printed area rate at Step 12 is equal to or less than the threshold of 6%, the accumulated charge at Step 11 is multiplied by the value of the actual average printed area rate divided by "6", so as to calculate the accumulated charge reduced in proportion to the actual average printed area rate (Step 13). Then, the list of accumulated charge for the copy is output (Step 20).

After the Step 20, the program returns to Step 14, where the number of the printed recording sheets of received facsimile data, stored in the facsimile counter 3*c*, is multiplied by the unit charge (4 yen) for a recording sheet for the facsimile, so as to calculate the total of accumulated charge for the facsimile. Then, it is checked whether or not the average printed area rate of the facsimile recording is more than the threshold of 4% (Step 15). When the average printed area rate of the facsimile recording is more than the threshold of 4%, the accumulated charge at Step 14 is directly output as the list of the accumulated lease charge for the facsimile (Step 20).

On the other hand, when the average printed area rate is equal to or less than the threshold of 4%, the lease charge at Step 14 is multiplied by the value of the actual average printed area rate divided by "4", so as to calculate the accumulated charge reduced in proportion to the actual average printed area rate (Step 16). Then, the list of accumulated lease charge for the facsimile is output (Step 20).

After outputting the list of accumulated lease charge for the facsimile, the program returns to Step 17, where the number of the printed recording sheets stored in the print counter 3*d* is multiplied by the unit charge (5 yen) for a recording sheet for the printer, so as to calculate the total of the accumulated lease charge for the printer. Next, it is checked whether or not the average printed area rate of the printer recording is more than the threshold of 5% (Step 18). When the average printed area rate for the printer is more than 5%, the accumulated charge at S17 is directly output as the list of accumulated charge for the printer (Step 20).

On the other hand, when the average printed area rate is equal to or less than the threshold of 5% at Step 18, the accumulated charge at Step 17 is multiplied by the value of the actual average printed area rate divided by "5", so as to calculate the accumulated charge reduced in proportion to the actual average printed area rate (Step 19). Then, the list of accumulated charge for the facsimile is output (Step 20). Further, the chart 2 shows a specific example of the output list of the accumulated charge for each type of functions. In this example, since the average printed area rate does not satisfy the threshold of 6% for the copy, based on the equation at Step 13 shown in FIG. 4, the accumulated charge is discounted.

CHART 2

| Function | Average Printed Area Rate (%) | Number (Sheets) | Unit Charge (Yen) | Accumulated Charge (Yen) |
|---|---|---|---|---|
| Copy | 5.5 | 3125 | 6 | 17187 (Discount Fee 1573) |

CHART 2-continued

| Function | Average Printed Area Rate (%) | Number (Sheets) | Unit Charge (Yen) | Accumulated Charge (Yen) |
|---|---|---|---|---|
| Facsimile | 4.7 | 378 | 4 | 1512 |
| Print | 5.9 | 1276 | 5 | 6380 |
| Total | — | 4779 | — | 25079 |

Besides, according to aforementioned embodiment, if the average printed area rate for each type of functions is more than the threshold set in advance, the accumulated charge is flat regardless of the value of average printed area rate. However, without the threshold, the accumulated charge varies, increases or decreases, in proportion to the value of the average printed area rate for each type of functions. In such case, for example, concerning the charge for the copy in FIG. 4, the step for checking at Step 12 is eliminated, and the program proceeds directly from Step 11 to Step 13, and from Step 13 to Step 20.

Moreover, according to the embodiment, it is assumed that the recording is carried out in a monochrome by the recording unit 12. However, in the case of a color recording by using the multicolored recording material (toner or the like), for example, instead of the printed area rate, the assumed amount of the used recording material can be figured out by using the average value of the ratio of the total of dot number of the area recorded by the recording material of each color to the dot number of the area capable of being recorded on the recording sheet.

What is claimed is:

1. A recording apparatus comprising:
   a print function for recording an image formed by an image forming device onto a recording medium,
   a copy function for reading an image of a document and recording the image onto the recording medium,
   a memory means for storing a charge for each function of the recording apparatus,
   a function for storing the charge per unit of recording medium for each function and calculating an accumulated charge for each function based on a used quantity for each function and the charge per unit,
   wherein when an average value of the printed area to the recording area on the recording medium is equal to or less than a threshold determined in advance, the calculating function reduces the accumulated charge according to the average value.

2. The recording apparatus according to claim 1, further comprising:
   a facsimile receiving function for recording a received image via a communication network onto the recording medium, and
   a function for storing a charge for the facsimile receiving function.

3. The recording apparatus according to claim 2, wherein the accumulated charge is recorded onto an accumulated charge recording sheet, after the accumulated charge is calculated for each function.

4. A recording apparatus capable of being connected to an image forming device comprising:
   a print function for recording an image formed by the image forming device onto a recording medium, and
   a copy function for reading the image of a document and recording the image onto the recording medium,
   wherein the recording apparatus comprises a memory means for storing the charge of the recording apparatus per unit quantity of recording medium set for each function, and a calculating means for calculating the accumulated charge for each function based on the number of the used recording media for each function and the charge per unit quantity,
   wherein the calculating means reduces the accumulated charge in proportion to an average value when the average value of the area of the image on the recording medium is equal to or lower than a threshold determined in advance.

5. The recording apparatus according to claim 4, further comprising:
   a network connection unit for connecting to a communication network, and
   a facsimile receiving function for recording the image received via the communication network onto the recording medium,
   wherein the charge per unit quantity is stored for the facsimile receiving function, and the accumulated charge for the facsimile receiving function is calculated.

6. The recording apparatus according to claim 4, wherein the accumulated charge is recorded onto an accumulated charge recording sheet after the accumulated charge is calculated for each function.

7. The recording apparatus according to claim 5, wherein the accumulated charge is recorded onto an accumulated charge recording sheet after the accumulated charge is calculated for each function.

8. The recording apparatus according to claim 1, wherein the threshold can be set for each function.

9. The recording apparatus according to claim 4, wherein the threshold can be set for each function.

10. The recording apparatus according to claim 5, wherein the threshold can be set each function.

11. A recording apparatus capable of being connected to an image forming device comprising:
   a print function for recording an image formed by the image forming device onto a recording medium;
   a copy function for reading an image of a document and recording the image onto a recording medium; and
   a memory means for storing a charge for each function of the recording apparatusu
   wherein when an average value of a printed area to a recording area on the recording medium is equal to or less than a threshold determined in advance, a calculating function reduces an accumulated charge according to the average value.

* * * * *